US011579890B1

(12) United States Patent
Gor et al.

(10) Patent No.: US 11,579,890 B1
(45) Date of Patent: Feb. 14, 2023

(54) FRAME PARSER EXECUTING SUBSETS OF INSTRUCTIONS IN PARALLEL FOR PROCESSING A FRAME HEADER

(71) Applicant: Synopsys, Inc., Mountain View, CA (US)

(72) Inventors: Mehulkumar Kantibhai Gor, Bengaluru (IN); Lokesh Kabra, Bengaluru (IN); Anil Pothireddy, Ontario (CA)

(73) Assignee: Synopsys, Inc., Mountain View, CA (US)

( * ) Notice: Subject to any disclaimer, the term of this patent is extended or adjusted under 35 U.S.C. 154(b) by 262 days.

(21) Appl. No.: 17/161,222

(22) Filed: Jan. 28, 2021

Related U.S. Application Data

(60) Provisional application No. 62/967,354, filed on Jan. 29, 2020.

(51) Int. Cl.
*G06F 9/38* (2018.01)
*G06F 16/27* (2019.01)
*H04L 45/74* (2022.01)
*H04L 69/22* (2022.01)

(52) U.S. Cl.
CPC ............ *G06F 9/3867* (2013.01); *G06F 16/27* (2019.01); *H04L 45/74* (2013.01); *H04L 69/22* (2013.01)

(58) Field of Classification Search
CPC .............................. G06F 9/3867; H04L 69/22
See application file for complete search history.

(56) References Cited

U.S. PATENT DOCUMENTS

| | | | | |
|---|---|---|---|---|
| 2004/0264468 | A1* | 12/2004 | Horton, Jr. .............. | H04L 65/65 725/111 |
| 2010/0254391 | A1* | 10/2010 | Kramer ................... | H04L 69/22 370/395.32 |
| 2011/0116507 | A1* | 5/2011 | Pais ........................ | H04L 45/00 370/392 |
| 2015/0156288 | A1* | 6/2015 | Lu ........................... | H04L 69/22 370/392 |

* cited by examiner

*Primary Examiner* — Jacob Petranek
(74) *Attorney, Agent, or Firm* — Park, Vaughan, Fleming & Dowler LLP; Laxman Sahasrabuddhe (57) ABSTRACT

An integrated circuit (IC) may include a set of instruction list engines (ILEs) that execute in parallel, where each ILE stores a subset of a set of instructions for processing a header of a frame, and where each ILE generates an ILE result based on executing the subset of the set of instructions. The IC may include a circuit to determine a result of parsing the header of the frame based on merging ILE results generated by the set of ILEs.

20 Claims, 9 Drawing Sheets

FRAME PARSER EXECUTING SUBSETS OF INSTRUCTIONS IN PARALLEL FOR PROCESSING A FRAME HEADER

RELATED APPLICATION

This application claims the benefit of U.S. Provisional Application Ser. No. 62/967,354, filed on 29 Jan. 2020, the contents of which are herein incorporated by reference in their entirety for all purposes.

TECHNICAL FIELD

The present disclosure relates to integrated circuit (IC) design. More specifically, the present disclosure relates to IC designs for frame parsing.

BACKGROUND

A frame may refer to a data transmission unit and may be used to communicate data in a network from a source node to a destination node. A frame may include a header and a payload. The header may include data that is used to route or forward the frame in the network from the source node to the destination node. The payload may include data that is desired to be communicated from the source node to the destination node.

SUMMARY

Some embodiments described herein may feature techniques and systems for parsing a frame. Some embodiments may include a set of instruction list engines (ILEs) that execute in parallel. Each ILE may store a subset of a set of instructions for processing a header of a frame and generate an ILE result based on executing the subset of the set of instructions. A result of parsing the header of the frame may then be determined based on merging ILE results generated by the set of ILEs. An action may be performed on the frame based on the result of parsing the header of the frame.

In some embodiments, each ILE may include an execution pipeline formed by coupling a set of parallel instruction processing engines (PIPEs), where the execution pipeline may execute the subset of the set of instructions.

In some embodiments, each ILE may perform computations specified in the subset of the set of instructions while the header of the frame is being received and may store intermediate results of the computations.

In some embodiments, each ILE may include a set of databases to store the intermediate results of the computations. Some embodiments may select an available database from the set of databases to store the intermediate results of the computations.

Some embodiments may include an execution pipeline formed by coupling a set of parallel instruction list engines (PILEs), where the execution pipeline may determine the result of parsing the header of the frame based on merging the ILE results generated by the set of ILEs.

Some embodiments may include a multiplexer to select the result of parsing the header of the frame from the ILE results generated by the set of ILEs.

BRIEF DESCRIPTION OF THE FIGURES

The disclosure may be understood based on the detailed description given below and the accompanying figures. The figures are for illustrative purposes, and do not limit the scope of the disclosure. Furthermore, the figures are not necessarily drawn to scale.

DETAILED DESCRIPTION

Aspects of the present disclosure relate to frame parsing. Data communication plays a critically important function in the modern economy. The term "frame parsing" refers to processing a frame at a network node. The result of "frame parsing" may then be used to perform an action on the frame. The rate at which frames are processed at a network node determines the amount of data that can be communicated through a network. It is desirable to increase the rate at which frames are processed at network nodes. It is also desirable to make the frame processing programmable to allow the frame processing to be adaptable.

Some frame processing techniques may have low throughput (i.e., the rate at which frames are processed is low), and some frame processing techniques use a large amount of circuitry to support out-of-order frame parsing and to parse a current frame while a next frame is being received.

Some embodiments described herein may feature methods and systems for frame parsing by using parallel and pipelined execution of programmable instructions. Some embodiments may reduce the amount of circuitry used for frame parsing by pre-processing frame header data while the frame is being received. Advantages of embodiments disclosed herein include, but are not limited to, (1) allowing frame parsing to be programmable, (2) increasing the rate at which frames are parsed, and (3) reducing the amount of circuitry and storage used for parsing frames.

Figure 1:
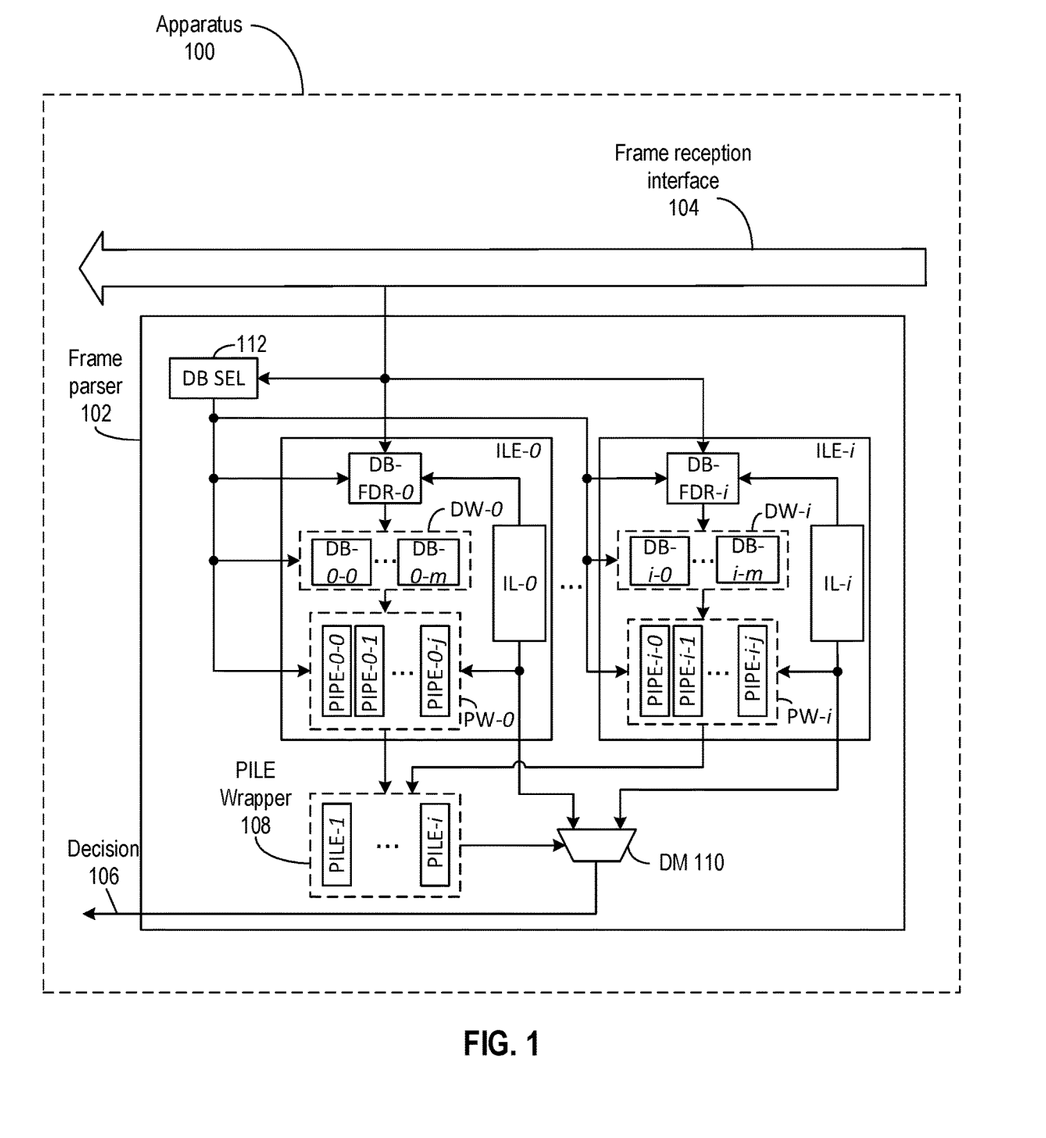
FIG. 1 illustrates a frame parser in accordance with some embodiments described herein.

FIG. 1 illustrates a frame parser in accordance with some embodiments described herein.

Frame parser 102 includes a set of instruction list engines (ILEs), such as ILE-0 through ILE-i. The set of ILEs may execute in parallel. Each ILE may store a subset of a set of instructions for processing a header of a frame and generate an ILE result based on executing the subset of the set of instructions. A result of parsing the header of the frame may then be determined based on merging ILE results generated by the set of ILEs. An action may be performed on the frame based on the result of parsing the header of the frame.

In some embodiments, a set of parallel instruction list engines (PILEs), such as PILE-1 through PILE-i, may be used to determine a result of parsing the header of the frame based on merging ILE results generated by the set of ILEs. Specifically, an execution pipeline may be formed by coupling the set of PILEs, and the execution pipeline may be used to determine the result of parsing the header of the frame based on merging ILE results generated by the set of ILEs.

In some embodiments, the number of PILEs may be one less than the number of ILEs. In some embodiments, frame parser 102 includes PILE wrapper 108, and decision multiplexer 110. PILE wrapper 108 may be used to route data in and out of the execution pipeline formed by the set of PILEs. Decision multiplexer 110 may be used to select the result of parsing the header of the frame from the ILE results generated by the set of ILEs.

Each ILE may include: an instruction list (IL) block, such as IL-0 in ILE-0 and IL-i in ILE-i; a set of databases, such as DB-0-0 through DB-0-m in ILE-0 and DB-i-0 through DB-i-m in ILE-i; a set of parallel-instruction-processor-engines (PIPEs), such as PIPE-0-0 through PIPE-0-j in ILE-0 and PIPE-i-0 through PIPE-i-j in ILE-i; and a database feeder block, such as DB-FDR-0 in ILE-0 and DB-FDR-i in ILE-i. Each ILE may include a database wrapper, such as DW-0 in ILE-0 and DW-i in ILE-i, and a PIPE wrapper, such as PW-0 in ILE-0 and PW-i in ILE-i.

Each IL block (e.g., IL-0 in ILE-0) may store a subset of the set of instructions for processing a header of a frame. An execution pipeline may be formed by coupling the set of PIPEs (e.g., PIPE-0-0 through PIPE-0-j in ILE-0). The execution pipeline may be used to execute the subset of the set of instructions. A PIPE wrapper (e.g., PW-0 in ILE-0) may be used to route data in and out of the execution pipeline formed by the set of PIPEs. A database feeder block (e.g., DB-FDR-0 in ILE-0) may perform computations specified in the subset of the set of instructions (e.g., IL-0) while the header of the frame is being received and may store intermediate results of the computations. Specifically, the intermediate results of the computations may be stored in a set of databases (e.g., DB-0-0 through DB-O-m in ILE-0). A database wrapper (e.g., DW-0 in ILE-0) may be used to route data in and out of the set of databases. In some embodiments, database selector 112 may select an available database from the set of databases to store the intermediate results of the computations.

Apparatus 100 may include frame parser 102 and frame reception interface 104. The apparatus may receive frames through frame reception interface 104. In some embodiments, frame parser 102 may receive frame header data from frame reception interface 104 without blocking other processing that is being performed on the frame by the apparatus. Specifically, frame parser 102 may sample the frame header data as the frame is received through frame reception interface 104. Frame parser 102 may continue processing the frame header data while the payload of the frame is received through frame reception interface 104. Frame parser 102 may generate decision 106 based on processing the frame header data, and the apparatus may use decision 106 to perform an action on the frame, e.g., the apparatus may forward the frame through a particular output port based on decision 106.

Database selector 112 may enable frame parser 102 to concurrently process frame header data of multiple frames. Specifically, database selector 112 may implement this feature by generating control signals that are provided to database feeder blocks DB-FDR-0 through DB-FDR-i, database wrappers DW-0 through DW-i, and PIPE wrappers PW-0 through PW-i.

The set of instructions for processing a frame header may be partitioned into a plurality of subsets of instructions, and each subset of instructions may be stored in a particular IL block. The number of instructions in each IL block may be the same or different. For example, if 100 instructions are used for processing a frame header, and frame parser 102 has four IL blocks (e.g., IL-0 through IL-3), then as one example, the four IL blocks may store 20, 35, 25, and 20 instructions, respectively. A jump instruction in an IL block may jump to any instruction within the IL block. A jump instruction may also jump to the first instruction of another IL block, but it may not jump to an instruction that is after the first instruction of another IL block.

Instruction in an IL block may specify computations (e.g., compare a header field with a given value) that are performed on frame header data. Each database feeder block may perform these computations on-the-fly (i.e., without buffering the header data) as the frame header is received. Specifically, as the frame header is received from frame reception interface 104, a database feeder block (e.g., DB-FDR-O) may perform computations specified in the IL block (e.g., IL-0) and store the results of the computations in a selected database (e.g., a database selected from DB-0-0 through DB-O-m). For example, if IL-0 includes an instruction that compares a specific field in a frame header with a particular value, then DB-FDR-0 may perform the comparison on-the-fly as soon as the specific field is received through frame reception interface 104 and store the result of the comparison in database DB-0-0 (assuming this database is selected for storing the result).

Performing on-the-fly computations can increase the rate of frame parsing and reduce the amount of storage by preventing the frame parsing to be blocked if an instruction requires a header field that has not been received. For example, suppose the $3^{rd}$ instruction operates on the $10^{th}$ header field, and the $4^{th}$ instruction operates on the $5^{th}$ header field. When the $5^{th}$ header field is received, some approaches may be unable to perform the computations specified in the $4^{th}$ instruction. Thus, some approaches may buffer header fields until the $10^{th}$ header field is received. Once the $10^{th}$ header field is received, the $3^{rd}$ instruction may be executed, and only then the $4^{th}$ instruction may be executed. Some embodiments disclosed herein use a database feeder block (e.g., DB-FDR-0) to perform the computation on-the-fly as soon as the specific field is received. Thus, in the above example, when the $5^{th}$ header field is received, the database feeder block (e.g., DB-FDR-O) may perform the computation specified in the $4^{th}$ instruction and store the result in a database (e.g., DB-0-0). Subsequently, when the $4^{th}$ instruction is executed, the result may be retrieved from the database (e.g., DB-0-0), which may use significantly fewer clock cycles than performing the computations that were performed by the database feeder block on-the-fly.

Each PIPE may execute one instruction specified in the IL block in each clock cycle. Thus, if there are (j+1) PIPE instances in an ILE (e.g., PIPE-0-0 through PIPE-0-j in ILE-0), then the ILE may execute up to (j+1) instructions in each clock cycle. A computation (e.g., a comparison) specified in an instruction may have already been performed on-the-fly by a database feeder block (e.g., DB-FDR-0) when the frame header was received. In such situations, when the instruction is executed by a PIPE, the PIPE (e.g., PIPE-0-0) may skip performing the computation, and directly use the result that was computed and stored by the database feeder block (e.g., DB-FDR-0) in the database (e.g., DB-0-0).

A database wrapper, such as DW-0, may include logic to route data into and out of databases. For example, database wrapper DW-0 may include logic that uses the control signals from database selector 112 to route data received from database feeder DB-FDR-0 into a selected database (e.g., DB-0-0), and routes data out of the selected database (e.g., DB-0-0).

PIPE wrapper, such as PW-0, may include logic that uses the control signals from database selector 112 to route the data to the PIPEs and instruct the PIPEs to process data. For example, PIPE wrapper PW-0 may include logic that uses the control signals from database selector 112 to route data received from database wrapper DW-0 to a selected PIPE (e.g., PIPE-0-0) and instruct the selected PIPE (e.g., PIPE-0-0) to process the data.

PILE wrapper 108 may include logic that routes the outputs received from the ILEs (i.e., ILE-0 through ILE-i) into the PILEs (i.e., PILE-1 through PILE-i). The output received from a given ILE (e.g., ILE-0) may contain a result of executing the instructions in the IL (e.g., IL-0) of the given ILE (e.g., ILE-0). A PIPE wrapper (e.g., PW-0) executes the instructions in the corresponding IL (e.g., IL-0) and provides the results to PILE wrapper 108. Pile wrapper 108 combines the results from each PIPE wrapper to generate a combined result that is the result of processing instructions from all ILs.

Decision multiplexer 110 may receive a selection signal from PILE wrapper 108, which selects a particular instruction in a particular IL. Next, decision multiplexer 110 may output decision data associated with the selected instruction in the IL. For example, the selection signal from PILE wrapper 108 may specify that the 5$^{th}$ instruction in IL-0 contains decision data (i.e., a result of executing the 5$^{th}$ instruction) that is to be outputted by frame parser 102. Next, decision multiplexer 110 may retrieve or access the 5$^{th}$ instruction in IL-0 and output the decision data (e.g., decision 106) associated with the instruction.

Figure 2:
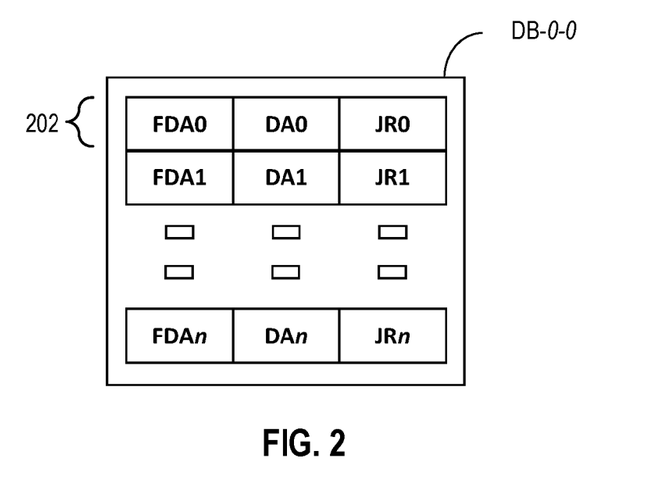
FIG. 2 illustrates a database in accordance with some embodiments described herein.

FIG. 2 illustrates a database in accordance with some embodiments described herein. A database, e.g., DB-0-0, may include multiple rows of data, e.g., row 202. Each row may include multiple fields, e.g., row 202 includes fields FDA0, DA0, and JR0. Each row in DB-0-0 may correspond to an instruction in an IL. For example, row 202 in DB-0-0 may correspond to the first instruction in IL-0. A first field in a database row (e.g., row 202) may indicate if frame data is available (e.g., FDA0), a second field in the database row (e.g., row 202) may indicate if a decision is available (e.g., DA0), and a third field may store the decision (which is the result of performing computations specified in an instruction corresponding to the row, e.g., row 202).

Figure 3:
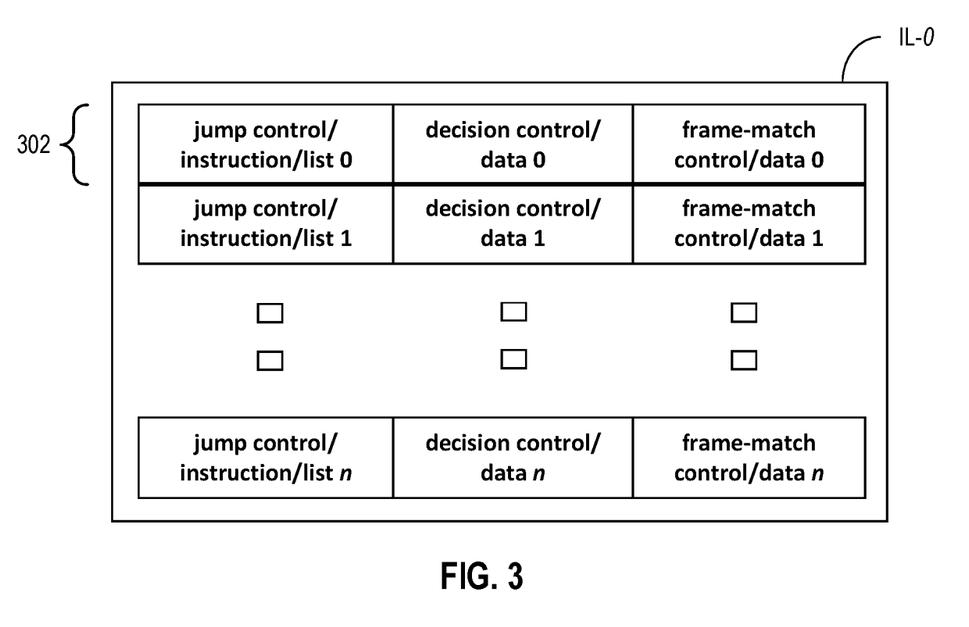
FIG. 3 illustrates an instruction list in accordance with some embodiments described herein.

FIG. 3 illustrates an instruction list in accordance with some embodiments described herein. An instruction list, e.g., IL-0, may include multiple rows, e.g., row 302, where each row corresponds to an instruction. Each row may include multiple fields, e.g., row 302 includes the fields "jump control/instruction/list 0," "decision control/data 0," and "frame-match control/data 0." A first field (e.g., "frame-match control/data 0") may specify a data pattern that is to be matched at a particular offset in the frame header. Specifically, this field may specify a frame data pattern (which is to be matched), a set of mask bits (which may be used to match only a subset of the bits in the frame data pattern), and a frame data offset, which may specify the location in the frame header where the pattern is to be matched. A second field (e.g., "decision control/data 0") may specify an action that is to be performed if the frame data pattern is matched. Examples of actions may include, but are not limited to, accept the frame with or without a forwarding port number, or reject the frame. A third field ("jump control/instruction/list 0") may specify a next instruction to execute based on the intermediate result of matching the data pattern as per the first field, and/or an action specified in the second field.

Figure 4:
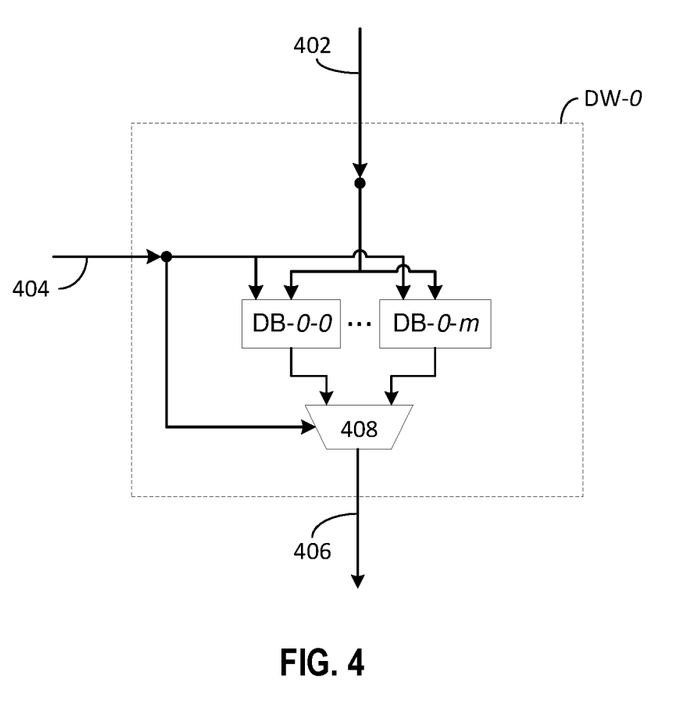
FIG. 4 illustrates a database wrapper in accordance with some embodiments described herein.

FIG. 4 illustrates a database wrapper in accordance with some embodiments described herein. Database wrapper, e.g., DW-0, may receive data 402 from a database feeder, e.g., DB-FDR-0, and control signals 404 from database selector 112. Database wrapper, e.g., DW-0, may include a database multiplexer 408 that may receive outputs from the set of databases, e.g., DB-0-0 through DB-0-m. Database multiplexer 408 may output data 406 from a particular database based on control signals 404, which are provided as the select input to multiplexer 408. Database selector 112 provides control signal 404 based on which frame is being processed.

Figure 5A:
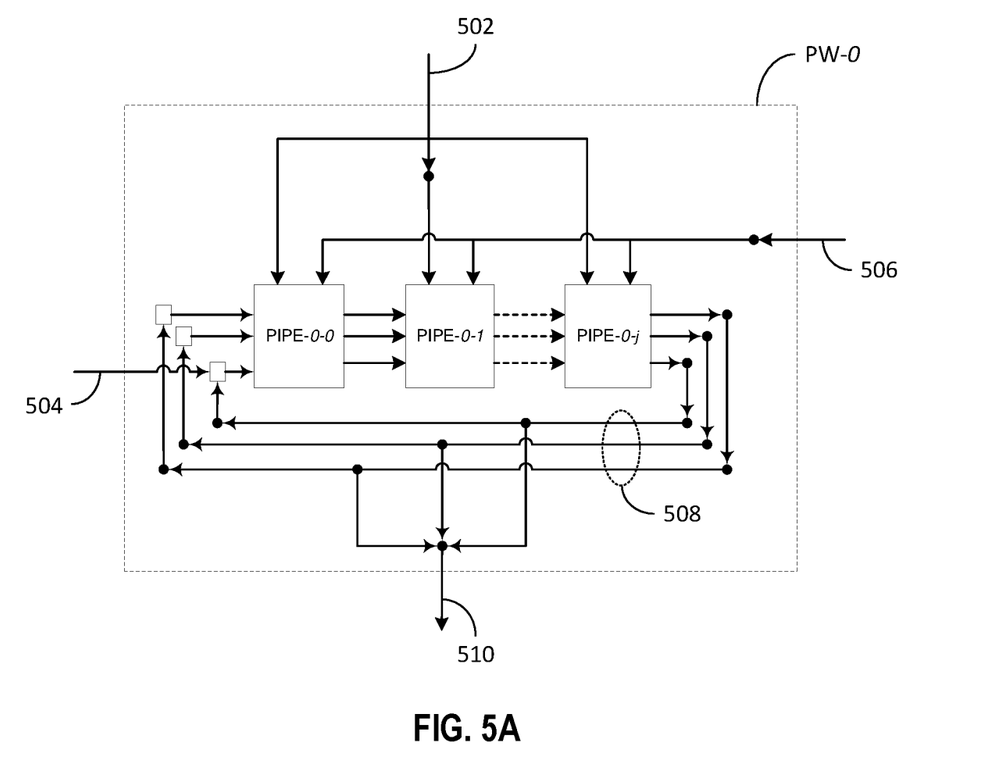
FIG. 5A illustrates a PIPE wrapper in accordance with some embodiments described herein.

FIG. 5A illustrates a PIPE wrapper in accordance with some embodiments described herein. PIPE wrapper, e.g., PW-0, may receive data 502 (which is the same as data 406 in FIG. 4) from a database wrapper, e.g., DW-0, control signals 504 from database selector 112, and instruction list information 506 from an IL, e.g., IL-0. Data paths 508 enable the set of PIPEs (e.g., PIPE-0-0 through PIPE-0-j) to process instructions in a pipelined fashion and to output a result 510 once processing completes for the IL (e.g., IL-0). Control signal 504 from database selector 112 may be used to reset or begin processing instructions.

Figure 5B:
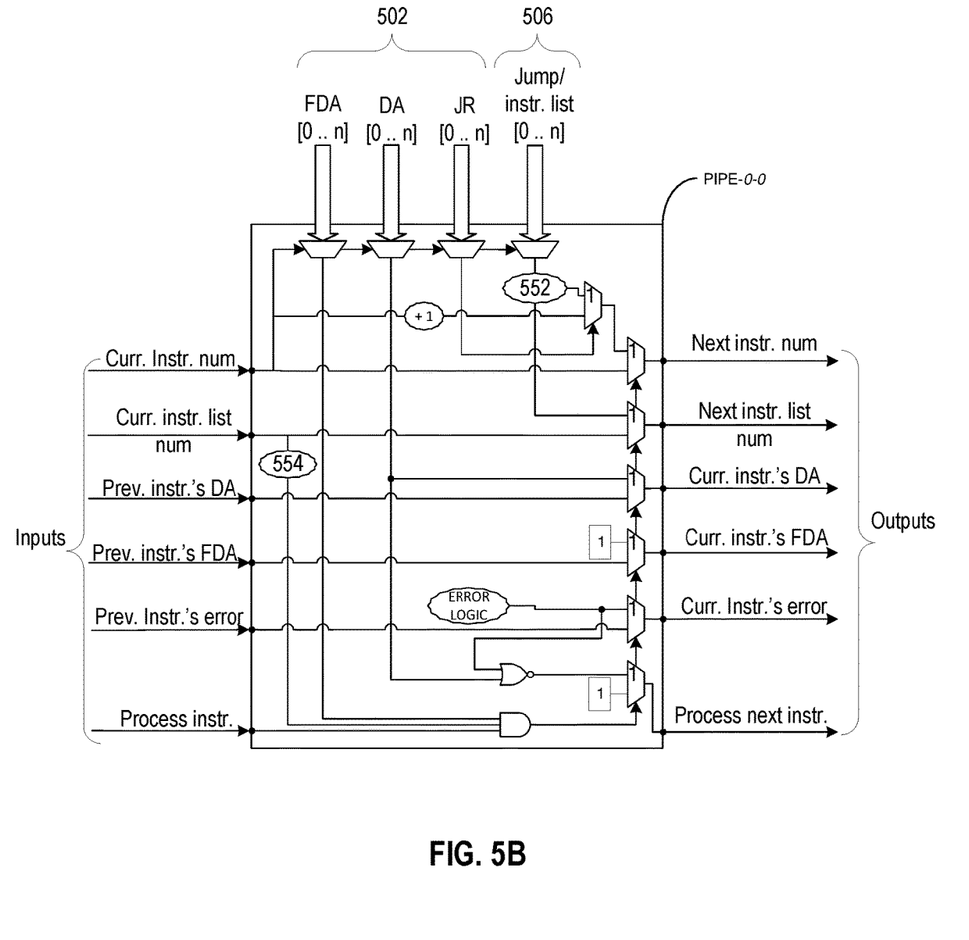
FIG. 5B illustrates a schematic of a PIPE in a PIPE wrapper in accordance with some embodiments described herein.

FIG. 5B illustrates a schematic of a PIPE within a PIPE wrapper in accordance with some embodiments described herein. PIPE-0-0 may receive inputs shown on the left and produce outputs shown on the right. PIPE-0-0 may access the databases and instruction lists as shown on the top. The inputs and outputs shown in FIG. 5B correspond to data paths 508 in FIG. 5A that couple inputs and outputs of PIPEs. The logic within PIPE-0-0 combines the inputs with preprocessed results stored in the database, and generates the outputs as shown on the right. All multiplexers along the top edge of PIPE-0-0 in FIG. 5B receive the same select signal. All multiplexers along the right edge of PIPE-0-0 in FIG. 5B receive the same select signal. Logic 552 separates the jump and instruction list information. Logic 554 checks whether the current instruction list number is corresponds to this ILE or not. If the current instruction list number corresponds to this ILE, then logic 554 outputs a logical "1" signal.

Figure 6A:
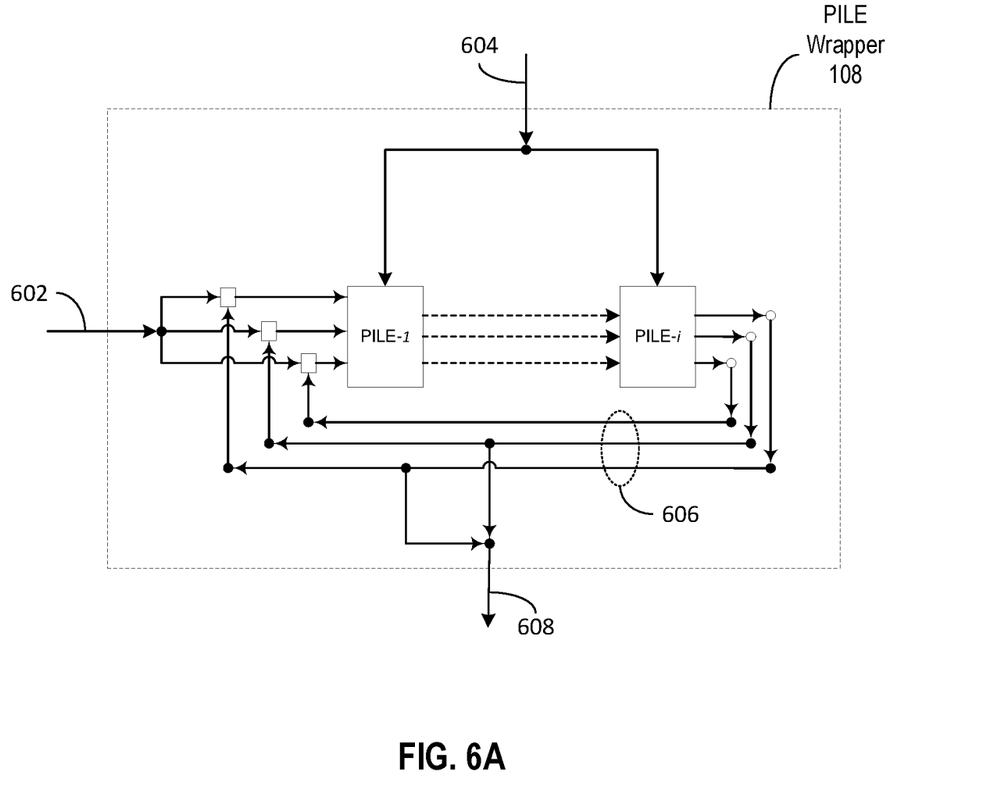
FIG. 6A illustrates a PILE wrapper in accordance with some embodiments described herein.

FIG. 6A illustrates a PILE wrapper in accordance with some embodiments described herein. PILE wrapper 108 may receive data 602 (which is the same as data 510 in FIG. 5A) from an initial PIPE wrapper (which begins parsing a frame), e.g., PW-0, and data 604 from other PIPE wrappers that execute in parallel, e.g., PW-1 through PW-i. Data paths 606 enable the set of PILEs (e.g., PILE-1 through PILE-i) to process instructions in a pipelined fashion and to output a result 608 once processing completes for the frame.

Figure 6B:
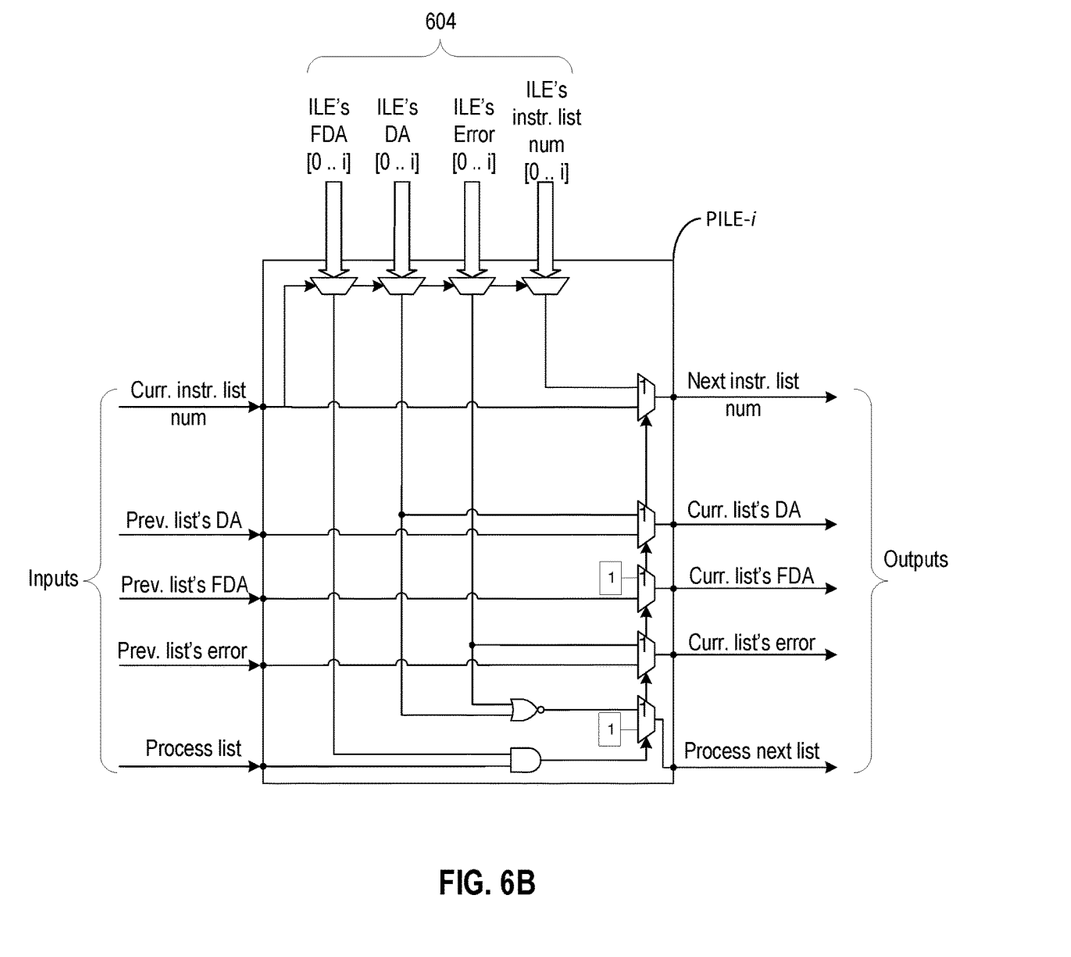
FIG. 6B illustrates a schematic of a PILE in a PILE wrapper in accordance with some embodiments described herein.

FIG. 6B illustrates a schematic of a PILE within a PILE wrapper in accordance with some embodiments described herein. PILE-i may receive inputs shown on the left and produce outputs shown on the right. PILE-i may receive data from each ILE as shown on the top. The inputs and outputs shown in FIG. 6B correspond to data paths 608 in FIG. 6A that couple inputs and outputs of PILEs. The logic within PILE-i combines the inputs with data received from the ILEs, and generates the outputs as shown on the right. All multiplexers along the top edge of PILE-i in FIG. 6B receive the same select signal. All multiplexers along the right edge of PILE-i in FIG. 6B receive the same select signal.

Figure 7:
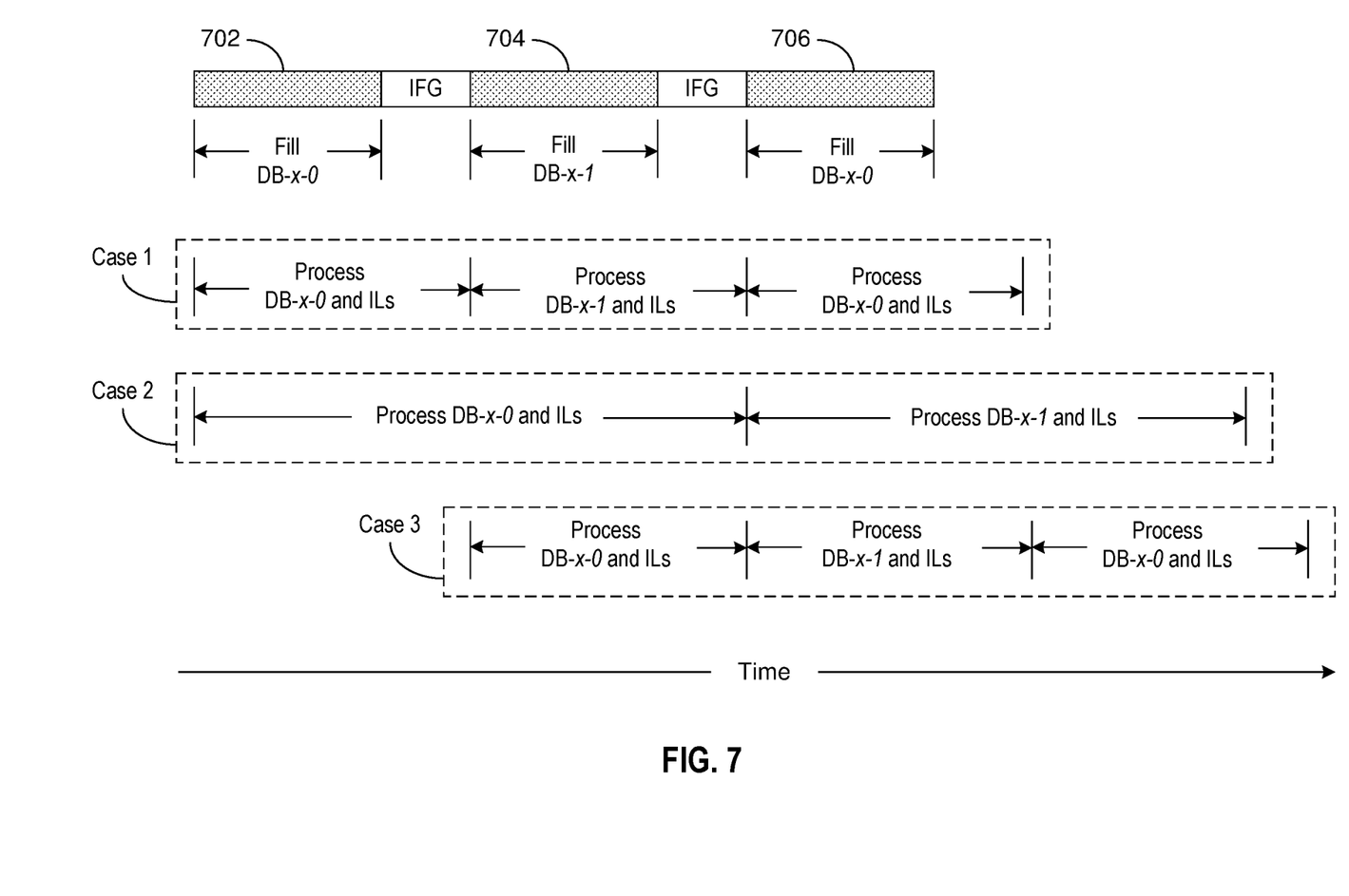
FIG. 7 illustrates concurrent processing of multiple frames in accordance with some embodiments described herein.

FIG. 7 illustrates concurrent processing of multiple frames in accordance with some embodiments described herein. Frames 702, 704, and 706 may be received over frame reception interface 104 in FIG. 1. Database "DB-v-w" in FIG. 1 refers to a database that is in ILE-v, and stores results for frame w. An interframe gap (shown as "IFG" in FIG. 7) may exist between two frames. Header data of frame 702 may be processed by database feeders, e.g., DB-FDR-0 through DB-FDR-i, and the results may be filled in databases DB-0-0, DB-1-0, DB-2-0, etc., which is shown as "DB-x-0" in FIG. 7. Frame parser 102 may be parsing frame 702 when frame 704 is received. Thus, frame 704 may be processed by database feeders, e.g., DB-FDR-0 through DB-FDR-i, and the results may be filled in databases DB-0-1, DB-1-1, DB-2-1, etc., which is shown as "DB-x-1" in FIG. 7. Frame parser 102 may have completed parsing frame 702 when frame 706 is received, thereby freeing databases DB-0-0, DB-1-0, DB-2-0, etc. Thus, frame 706 may be processed by database feeders, e.g., DB-FDR-0 through DB-FDR-i, and the results may be filled in databases DB-0-0, DB-1-0, DB-2-0, etc.

Case 1, 2, and 3 illustrate three different frame processing timeline possibilities. In case 1, frame 704 is received when frame 702 has been processed, and frame 706 is received when frame 704 has been processed. In case 2, processing of frame 702 is not complete when frame 704 is received. Thus, in case 2, header of frame 702 may be parsed while frame 704 is received. In case 3, PIPEs may be executing other instructions and are unable to process the new frames. Thus, in case 3, database selector 112 processes the values stored in the databases when the PIPEs are available. Database selector 112 selects which frame to process, and accordingly provides instructions to the ILEs. The databases store the preprocessed frame header data, which is used by the PIPEs when database selector 112 instructs the PIPEs to process a particular frame.

Figure 8:
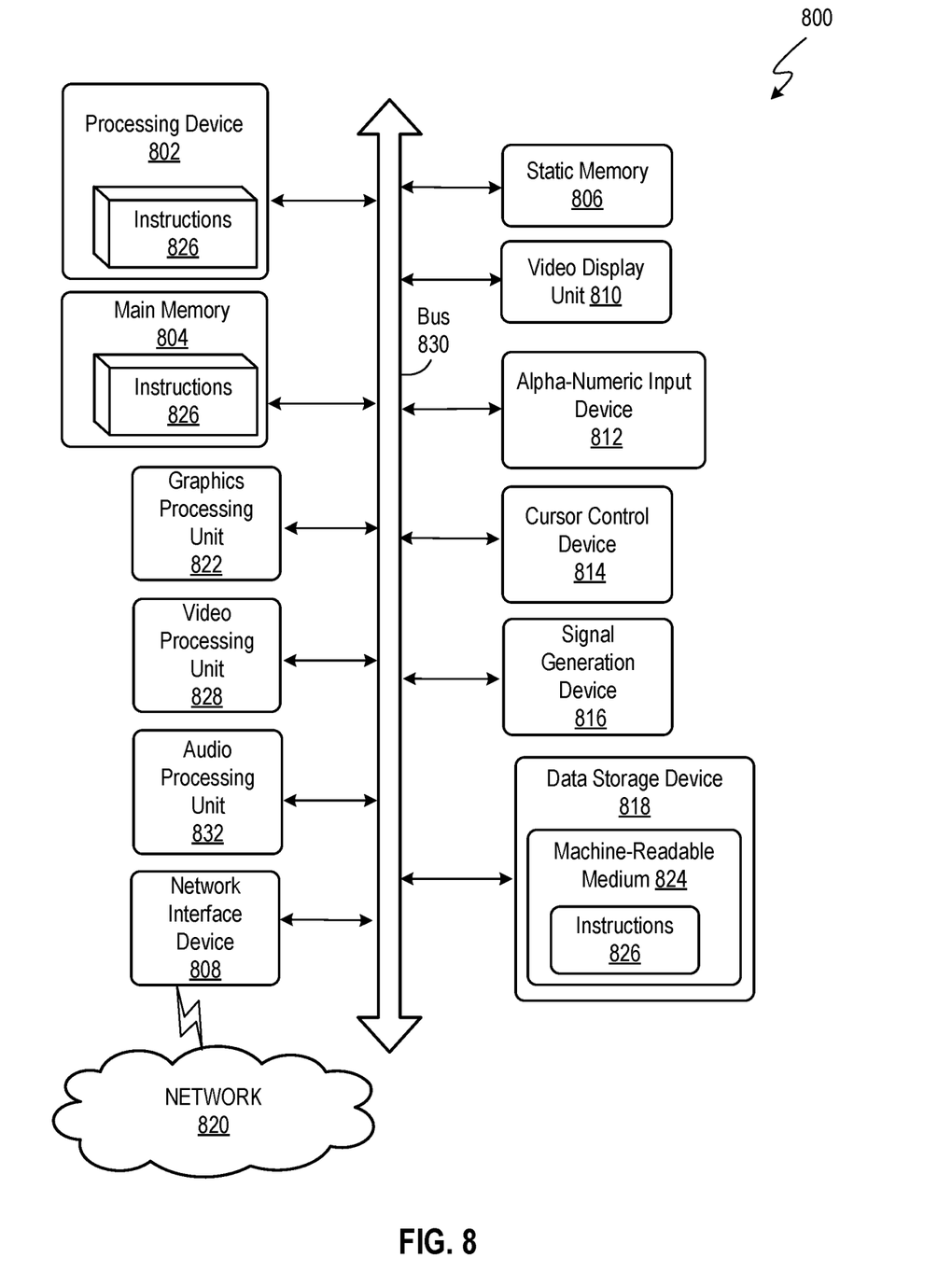
FIG. 8 illustrates an example machine in accordance with some embodiments described herein.

FIG. 8 illustrates an example machine in accordance with some embodiments described herein. In some embodiments, the machine may include frame parser 102, e.g., as part of network interface device 808. In some implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. An integrated circuit (IC), comprising:
   a set of instruction list engines (ILEs) that execute in parallel, wherein each ILE stores a subset of a set of instructions for processing a header of a frame, and wherein each ILE generates an ILE result based on executing the subset of the set of instructions; and
   a first circuit to determine a result of parsing the header of the frame based on merging ILE results generated by the set of ILEs.

2. The IC of claim 1, wherein each ILE comprises a first execution pipeline formed by coupling a set of parallel instruction processing engines (PIPEs), wherein the first execution pipeline executes the subset of the set of instructions.

3. The IC of claim 1, wherein each ILE comprises a preprocessing circuit to perform computations specified in the subset of the set of instructions while the header of the frame is being received and store intermediate results of the computations.

4. The IC of claim 3, wherein each ILE comprises a set of databases to store the intermediate results of the computations.

5. The IC of claim 4, comprising a second circuit to select an available database from the set of databases to store the intermediate results of the computations.

6. The IC of claim 1, wherein the first circuit comprises a second execution pipeline formed by coupling a set of parallel instruction list engines (PILEs), wherein the second execution pipeline determines the result of parsing the header of the frame based on merging the ILE results generated by the set of ILEs.

7. The IC of claim 6, wherein the first circuit comprises a multiplexer to select the result of parsing the header of the frame from the ILE results generated by the set of ILEs.

8. An apparatus, comprising:
   a frame reception interface to receive a set of frames; and
   a frame parser, comprising:
      a set of instruction list engines (ILEs) that execute in parallel, wherein each ILE stores a subset of a set of instructions for processing a header of a frame from the set of frames, and wherein each ILE generates an ILE result based on executing the subset of the set of instructions; and
      a first circuit to determine a result of parsing the header of the frame based on merging ILE results generated by the set of ILEs.

9. The apparatus of claim 8, wherein each ILE comprises a first execution pipeline formed by coupling a set of parallel instruction processing engines (PIPEs), wherein the first execution pipeline executes the subset of the set of instructions.

10. The apparatus of claim 9, wherein each ILE comprises a preprocessing circuit to perform computations specified in the subset of the set of instructions while the header of the frame is being received and store intermediate results of the computations.

11. The apparatus of claim 10, wherein each ILE comprises a set of databases to store the intermediate results of the computations.

12. The apparatus of claim 11, comprising a second circuit to select an available database from the set of databases to store the intermediate results of the computations.

13. The apparatus of claim 8, wherein the first circuit comprises a second execution pipeline formed by coupling a set of parallel instruction list engines (PILEs), wherein the second execution pipeline determines the result of parsing the header of the frame based on merging the ILE results generated by the set of ILEs.

14. The apparatus of claim 13, wherein the first circuit comprises a multiplexer to select the result of parsing the header of the frame from the ILE results generated by the set of ILEs.

15. A method, comprising:

receiving a set of frames over a frame reception interface circuit;

processing a header of a frame from the set of frames by a set of instruction list engines (ILEs) that execute in parallel, wherein each ILE stores a subset of a set of instructions for processing the header of the frame, and wherein each ILE generates an ILE result based on executing the subset of the set of instructions; and determining a result of parsing the header of the frame based on merging ILE results generated by the set of ILEs.

16. The method of claim 15, comprising:

performing computations specified in the subset of the set of instructions while the header of the frame is being received over the frame reception interface circuit; and storing intermediate results of the computations.

17. The method of claim 16, wherein the intermediate results of the computations are stored in a set of databases.

18. The method of claim 17, comprising selecting an available database from the set of databases to store the intermediate results of the computations.

19. The method of claim 15, comprising selecting the result of parsing the header of the frame from the ILE results generated by the set of ILEs.

20. The method of claim 15, comprising performing an action on the frame based on the result of parsing the header of the frame.

\* \* \* \* \*